(12) United States Patent
Maruyama (10) Patent No.: US 11,858,410 B2
(45) Date of Patent: Jan. 2, 2024

(54) VEHICULAR LAMP AND VEHICLE

(71) Applicant: KOITO MANUFACTURING CO., LTD., Tokyo (JP)

(72) Inventor: Yuta Maruyama, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 131 days.

(21) Appl. No.: 17/437,322

(22) PCT Filed: Feb. 19, 2020

(86) PCT No.: PCT/JP2020/006473
§ 371 (c)(1),
(2) Date: Sep. 8, 2021

(87) PCT Pub. No.: WO2020/184103
PCT Pub. Date: Sep. 17, 2020

(65) Prior Publication Data
US 2022/0176869 A1    Jun. 9, 2022

(30) Foreign Application Priority Data
Mar. 8, 2019 (JP) ................................. 2019-042663

(51) Int. Cl.
*B60Q 1/00* (2006.01)
*F21S 41/32* (2018.01)
*G01S 7/03* (2006.01)

(52) U.S. Cl.
CPC ............ *B60Q 1/0023* (2013.01); *F21S 41/32* (2018.01); *G01S 7/03* (2013.01)

(58) Field of Classification Search
CPC .......... B60Q 1/0023; F21S 41/32; G01S 7/03
See application file for complete search history.

(56) References Cited

U.S. PATENT DOCUMENTS

| 6,496,138 B1 | 12/2002 | Honma |
| 2017/0274832 A1 | 9/2017 | Abe |
| 2018/0081094 A1 | 3/2018 | Aikin et al. |

FOREIGN PATENT DOCUMENTS

| EP | 2141048 A1 | 1/2010 |
| JP | H09277887 A | 10/1997 |
| JP | H11231041 A | 8/1999 |
| JP | 2001-107324 A | 4/2001 |
| JP | 2002-022399 A | 1/2002 |
| JP | 2004-069658 A | 3/2004 |
| JP | 2010015721 A | 1/2010 |
| JP | 2010135087 A | 6/2010 |
| JP | 2014127225 A | 7/2014 |
| JP | 2017-181480 A | 10/2017 |

(Continued)

OTHER PUBLICATIONS

First Office Action in corresponding Chinese Application No. 202080019740.3, dated Nov. 29, 2022 (18 pages).

(Continued)

*Primary Examiner* — Thomas M Sember
(74) *Attorney, Agent, or Firm* — Osha Bergman Watanabe & Burton LLP (57) ABSTRACT

A front left lamp includes a housing, an outer cover which covers an opening of the housing, a lighting unit disposed in a space formed by the housing and the outer cover, and a corner cube reflector, which is configured to increase radar radio wave reflectance and is disposed to face the housing.

6 Claims, 8 Drawing Sheets

(56) References Cited

FOREIGN PATENT DOCUMENTS

| | | |
|---|---|---|
| JP | 2018063895 A | 4/2018 |
| JP | 2018144505 A | 9/2018 |

OTHER PUBLICATIONS

International Search Report issued in corresponding International Application No. PCT/JP2020/006473; dated Apr. 14, 2020 (6 pages).
Written Opinion of the International Searching Authority issued in corresponding International Application No. PCT/JP2020/006473; dated Apr. 14, 2020 (4 pages).

VEHICULAR LAMP AND VEHICLE

TECHNICAL FIELD

The present disclosure relates to a vehicular lamp and a vehicle.

BACKGROUND ART

Currently, research on automatic driving technology for an automobile is being actively conducted in each country and legislation is being considered in each country to allow a vehicle (hereinafter, "vehicle" refers to an automobile) to drive on a public road in an automatic driving mode. Here, in the automatic driving mode, a vehicle system automatically controls traveling of a vehicle. Specifically, in the automatic driving mode, the vehicle system automatically performs at least one of steering control (control of a vehicle's traveling direction), brake control and accelerator control (vehicle braking, acceleration and deceleration control) based on information (surrounding environment information) indicating surrounding environment of the vehicle obtained from sensors such as a camera and a radar (for example, a laser radar and a millimeter-wave radar). On the other hand, in a manual driving mode described below, a driver controls traveling of a vehicle, as is the case with many conventional vehicles. Specifically, in the manual driving mode, the traveling of the vehicle is controlled according to the driver's operation (steering operation, brake operation, accelerator operation) and the vehicle system does not automatically perform steering control, brake control, and accelerator control. The driving mode of a vehicle is not a concept which exists only in some vehicles, but a concept which exists in all vehicles including conventional vehicles which do not have an automatic driving function. Further, the driving mode of a vehicle is classified according to, for example, a vehicle control method or the like.

Thus, in the future, on a public road, it is expected that vehicles (hereinafter, appropriately referred to as "automatic driving vehicle") traveling in the automatic driving mode and vehicles (hereinafter, appropriately referred to as "manual driving vehicles") traveling in the manual driving mode will coexist.

As an example of the automatic driving technology, Patent Literature 1 discloses an automatic following traveling system in which a following vehicle automatically follows a preceding vehicle. In the automatic following traveling system, each of the preceding vehicle and the following vehicle is equipped with a lighting system, and textual information is displayed on the lighting system of the preceding vehicle to prevent other vehicles from interrupting between the preceding vehicle and the following vehicle and textual information indicating that the vehicle is automatically following is displayed on the lighting system of the following vehicle.

CITATION LIST

Patent Literature

Patent Literature 1: JP-A-H09-277887

SUMMARY OF INVENTION

Technical Problem

By the way, with the development of automatic driving technology, it is necessary to dramatically increase detection accuracy of surrounding environment of a vehicle. In this respect, a radar such as a millimeter-wave radar is mounted on the vehicle as one of sensors for acquiring surrounding environment information of the vehicle. The radar mounted on the vehicle receives a reflected radio wave which is reflected by an object which exists outside the vehicle after being radiated from the radar. Next, the radar can measure a position (distance and direction) of the object and a relative velocity between the object and the own vehicle based on the radiated radio wave and the reflected radio wave.

The detection accuracy of the surrounding environment using radar largely depends on an intensity of the reflected radio wave reflected by objects such as another vehicle. For example, when the object detected by the radar is a vehicle, if the intensity of the reflected radio waves reflected by the vehicle is low, an S/N ratio (signal-to-noise ratio) deteriorates, and thus there is a risk that the position and relative velocity of the vehicle cannot be measured accurately. In this way, in order to improve the detection accuracy of the surrounding environment using the radar, it is conceivable to improve the radar radio wave reflectance of the vehicle, which is a detection target.

An object of the present disclosure is to provide a vehicular lamp and a vehicle capable of increasing reflectance of a radar radio wave from another vehicle.

Solution to Problem

A vehicular lamp according to an aspect of the present disclosure includes a member configured to increase radar radio wave reflectance.

According to the configuration described above, it is possible to provide a vehicular lamp capable of increasing the radar radio wave reflectance (that is, the reflectance of radar radio waves from another vehicle).

The vehicular lamp may further include a housing, an outer cover covering an opening of the housing, and a lighting unit disposed in a space formed by the housing and the outer cover. The member may be at least one metal member disposed to face the housing.

According to the configuration described above, since at least one metal member is disposed to face the housing, the reflectance of radar radio waves from another vehicle can be increased by the metal member.

The metal member may be disposed in the space.

According to the configuration described above, since the metal member is disposed in the space, it is possible to suppress an increase in an outer size of the vehicular lamp.

The metal member may be configured as a corner cube reflector.

According to the configuration described above, since the metal member is configured as the corner cube reflector, a radar reflection cross-sectional area (Radar cross-section: RCS) of the metal member is improved. In this way, it is possible to increase the radar radio wave reflectance of the vehicular lamp.

The vehicular lamp may include a housing, an outer cover covering an opening of the housing, and a lighting unit disposed in a space formed by the housing and the outer cover. The member may be at least one of the outer cover and the housing. A thickness D of at least one of the outer cover and the housing may be defined by a following equation.

$$D = 1/4 \times \lambda / \varepsilon_r^{1/2} \times (2n+1)$$

Here, $\lambda$ is a wavelength of a radar radio wave, $\varepsilon_r$ is relative permittivity of at least one of the outer cover and the housing, and n is an integer of zero or more.

According to the configuration described above, since the thickness D of at least one (hereinafter, referred to as a reflective member) of the outer cover and the housing is set to $D=\frac{1}{4} \times \lambda / \varepsilon_r^{1/2} \times (2n+1)$, the radio waves reflected by one surface of the reflective member and the radio waves reflected by the other surface of the reflective member strengthen each other. In this way, at least one of the outer cover and the housing can increase the reflectance for the radar radio wave of the wavelength $\lambda$ radiated from another vehicle. Therefore, it is possible to provide a vehicular lamp capable of increasing the reflectance for radar radio waves having the wavelength of $\lambda$.

When the wavelength $\lambda$ of the radar radio wave is 3.92 mm and the relative permittivity is 2.7, the thickness D may be set to 0.59 mm×(2n+1).

According to the configuration described above, at the wavelength $\lambda$=3.92 mm (frequency f=76.5 GHz) of the radar radio wave, the thickness D of at least one of the outer cover and the housing having relative permittivity of 2.7 is set to a value of 0.59 mm×(2n+1). In this way, at least one of the outer cover and the housing can increase the reflectance for the millimeter-wave radar of the frequency f=76.5 GHz radiated from another vehicle. Therefore, it is possible to provide a vehicular lamp capable of increasing the reflectance for the millimeter-wave radar.

A vehicle which includes the vehicular lamp described above may be provided.

According to the above, it is possible to provide a vehicle capable of increasing the radar radio wave reflectance.

Advantageous Effects of Invention

According to the present disclosure, it is possible to provide a vehicular lamp and a vehicle capable of increasing reflectance of radar radio waves from another vehicle.

DESCRIPTION OF EMBODIMENTS

Hereinafter, embodiments (hereinafter, simply referred to as "the embodiments") of the present disclosure will be described with reference to the drawings. For convenience of explanation, description of a member having the same reference numerals as those of a member already described in the description of the embodiment will be omitted. In addition, dimensions of each member illustrated in the drawing may differ from actual dimensions of each member for convenience of explanation.

Further, in the description of the embodiment, for convenience of explanation, "left-right direction, "front-rear direction", and "up-down direction" may be appropriately referred to. These directions are relative directions set for a vehicle 1 illustrated in FIG. 1. Here, the "front-rear direction" is a direction including a "forward direction" and a "rear direction". The "left-right direction" is a direction including a "left direction" and a "right direction". The "up-down direction" is a direction including an "upward direction" and a "downward direction". Although the up-down direction is not illustrated in FIG. 1, the up-down direction is a direction perpendicular to the front-rear direction and the left-right direction.

Figure 1:
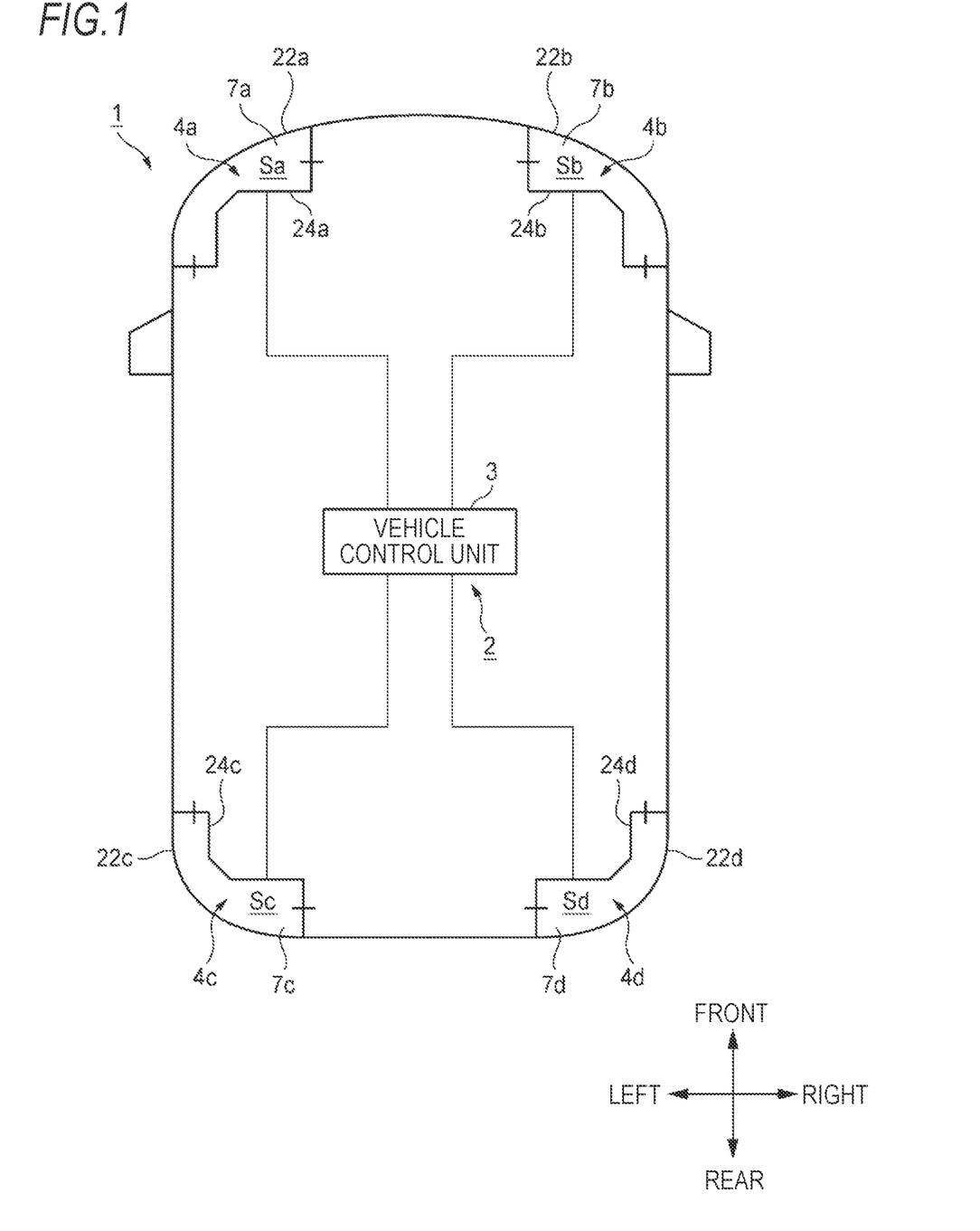
FIG. 1 illustrates a schematic view of a vehicle including a vehicle system according to an embodiment (hereinafter, referred to as the embodiment) of the invention.
Figure 2:
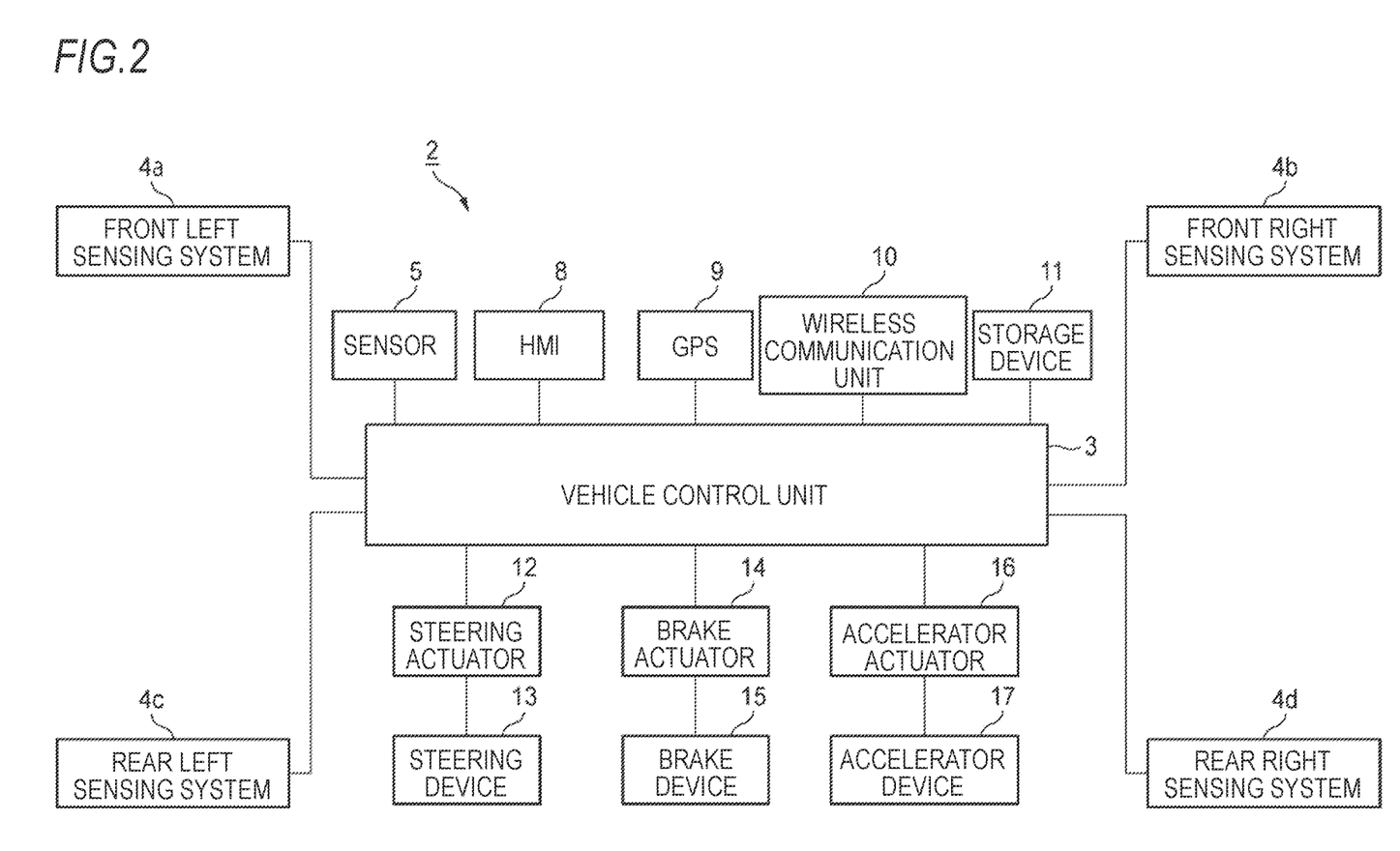
FIG. 2 is a block diagram illustrating the vehicle system according to the embodiment.

First, the vehicle 1 and a vehicle system 2 according to the embodiment will be described with reference to FIGS. 1 and 2. FIG. 1 is a schematic view illustrating a top view of the vehicle 1 including the vehicle system 2. FIG. 2 is a block diagram illustrating the vehicle system 2.

As illustrated in FIG. 1, the vehicle 1 is a vehicle (automobile) capable of traveling in an automatic driving mode. The vehicle 1 includes the vehicle system 2, a front left lamp 7a, a front right lamp 7b, a rear left lamp 7c, and a rear right lamp 7d. In the embodiment, the vehicle 1 is described as a four-wheel automobile, but the vehicle 1 may be a motorcycle or a tricycle.

As illustrated in FIGS. 1 and 2, the vehicle system 2 includes at least a vehicle control unit 3, a front left sensing system 4a (hereinafter, simply referred to as "sensing system 4a"), a front right sensing system 4b (hereinafter, simply referred to as "sensing system 4b"), a rear left sensing system 4c (hereinafter, simply referred to as "sensing system 4c"), and a rear right sensing system 4d (hereinafter, simply referred to as "sensing system 4d").

Further, the vehicle system 2 includes a sensor 5, a Human Machine Interface (HMI) 8, a Global Positioning System (GPS) 9, a wireless communication unit 10, and a storage device 11. Further, the vehicle system 2 includes a steering actuator 12, a steering device 13, a brake actuator 14, a brake device 15, an accelerator actuator 16, and an accelerator device 17.

The vehicle control unit 3 is configured to control the traveling of the vehicle 1. The vehicle control unit 3 is composed of, for example, at least one Electronic Control Unit (ECU). The electronic control unit includes a computer system (for example, System on a Chip (SoC) or the like) including one or more processors and one or more memories and an electronic circuit composed of active elements such as transistors and passive elements. The processor includes, for example, at least one of a Central Processing Unit (CPU), a Micro Processing Unit (MPU), a Graphics Processing Unit (GPU), and a Tensor Processing Unit (TPU). The CPU may be composed of a plurality of CPU cores. The GPU may be composed of a plurality of GPU cores. The memory includes a Read Only Memory (ROM) and a Random Access Memory (RAM). A vehicle control program may be stored in the ROM. For example, the vehicle control program may include an artificial intelligence (AI) program for autonomous driving. An AI program is a program (trained model) constructed by supervised or unsupervised machine learning (particularly deep learning) using a multi-layer neural network. The RAM may temporarily store a vehicle control program, vehicle control data, and/or surrounding environment information indicating surrounding environment of the vehicle. The processor may be configured to expand a program specified from various vehicle control programs stored in the ROM on the RAM and execute various processes in cooperation with the RAM. Further, the computer system may be configured by a non-von Neumann type computer such as an Application Specific Integrated Circuit (ASIC) or a Field-Programmable Gate Array (FPGA). Further, the computer system may be composed of a combination of a von Neumann type computer and a non-von Neumann type computer.

Figure 3:
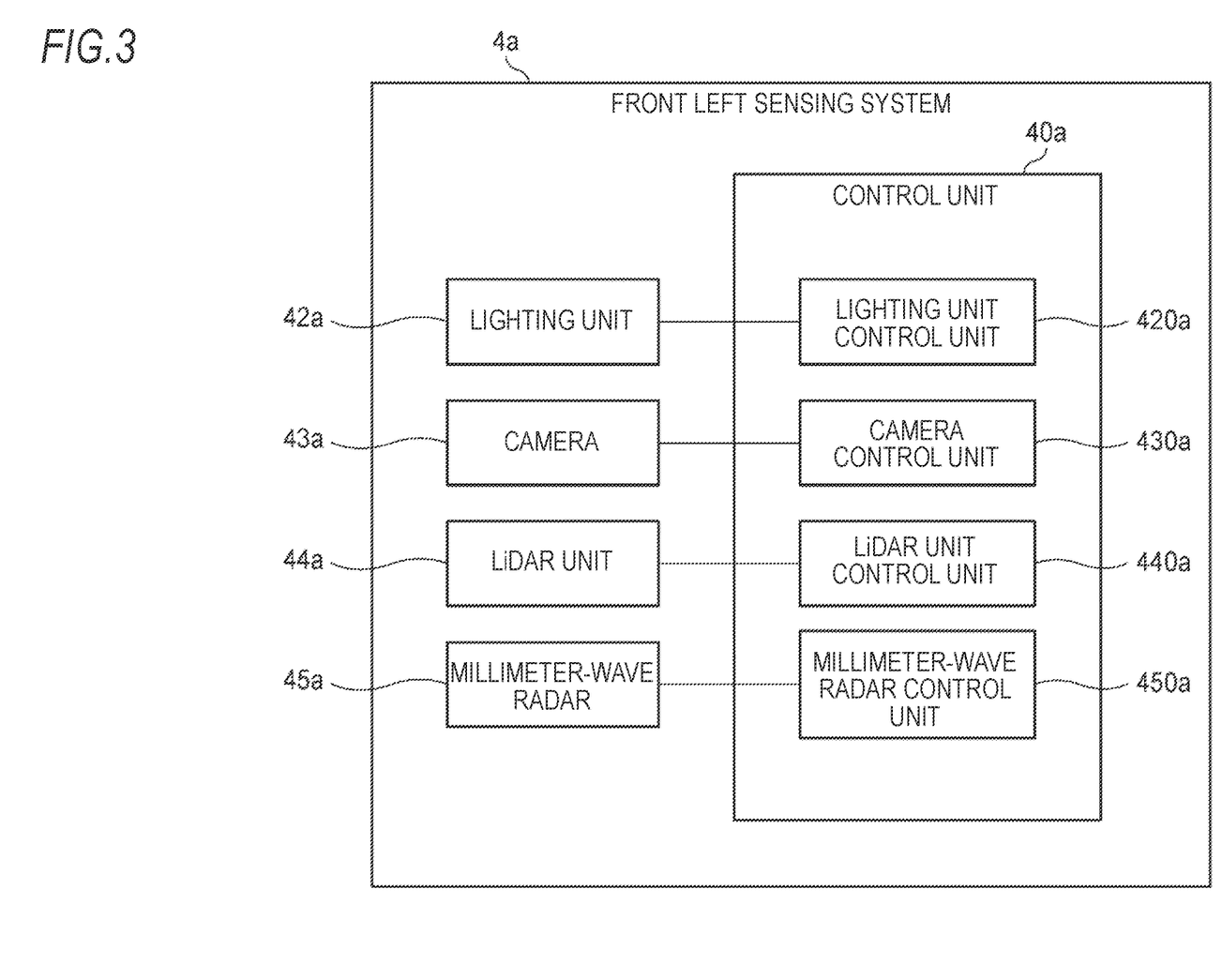
FIG. 3 is a block diagram illustrating a front left sensing system.

Each of the sensing systems 4a to 4d is configured to detect the surrounding environment of the vehicle 1. In the description of the embodiment, it is assumed that each of the sensing systems 4a to 4d includes the same component. Therefore, in the following, the sensing system 4a will be described with reference to FIG. 3. FIG. 3 is a block diagram illustrating the sensing system 4a.

As illustrated in FIG. 3, the sensing system 4a includes a control unit 40a, a lighting unit 42a, a camera 43a, a Light Detection and Ranging (LiDAR) unit 44a, and a millimeter-wave radar 45a. The control unit 40a, the lighting unit 42a, the camera 43a, the LiDAR unit 44a, and the millimeter-wave radar 45a are disposed in a space Sa formed by a housing 24a of the front left lamp 7a and a translucent outer cover 22a illustrated in FIG. 1. The outer cover 22a is configured to cover an opening of the housing 24a. The control unit 40a may be disposed at a predetermined position of the vehicle 1 other than the space Sa. For example, the control unit 40a may be integrally configured with the vehicle control unit 3.

The control unit 40a is configured to control operations of the lighting unit 42a, the camera 43a, the LiDAR unit 44a, and the millimeter-wave radar 45a respectively. In this respect, the control unit 40a functions as a lighting unit control unit 420a, a camera control unit 430a, a LiDAR unit control unit 440a, and a millimeter-wave radar control unit 450a.

The control unit 40a is composed of at least one electronic control unit (ECU). The electronic control unit includes a computer system (for example, SoC and the like) including one or more processors and one or more memories, and an electronic circuit composed of active elements such as transistors and passive elements. The processor includes at least one of a CPU, an MPU, a GPU, and a TPU. The memory includes a ROM and a RAM. Further, the computer system may be composed of a non-von Neumann type computer such as an ASIC or an FPGA.

The lighting unit 42a is configured to form a light distribution pattern by emitting light toward the outside (front) of the vehicle 1. The lighting unit 42a has a light source which emits light and an optical system. The light source may be composed of, for example, a plurality of light emitting elements arranged in a matrix (for example, N rows×M columns, N>1, M>1). The light emitting element is, for example, a Light Emitting Diode (LED), a Laser Diode (LD), or an organic EL element. The optical system may include at least one of a reflector configured to reflect the light emitted from the light source toward the front of the lighting unit 42a, and a lens configured to refract the light emitted directly from the light source or the light reflected by the reflector.

The lighting unit control unit 420a is configured to control the lighting unit 42a so that the lighting unit 42a emits a predetermined light distribution pattern toward the front area of the vehicle 1. For example, the lighting unit control unit 420a may change the light distribution pattern emitted from the lighting unit 42a according to a driving mode of the vehicle 1.

The camera 43a is configured to detect the surrounding environment of the vehicle 1. In particular, the camera 43a is configured to acquire image data indicating the surrounding environment of the vehicle 1 and then transmit the image data to the camera control unit 430a. The camera control unit 430a may specify the surrounding environment information based on the transmitted image data. Here, the surrounding environment information may include information on an object existing outside the vehicle 1. For example, the surrounding environment information may include information on attributes of the object existing outside the vehicle 1, and information on the distance, direction, and/or position of the object with respect to the vehicle 1. The camera 43a includes, for example, an imaging element such as a Charge-Coupled Device (CCD) or a Complementary Metal Oxide Semiconductor (CMOS).

The LiDAR unit 44a is configured to detect the surrounding environment of the vehicle 1. In particular, the LiDAR unit 44a is configured to acquire point cloud data indicating the surrounding environment of the vehicle 1 and then transmit the point cloud data to the LiDAR unit control unit 440a. The LiDAR unit control unit 440a may specify the surrounding environment information based on the transmitted point cloud data.

More specifically, the LiDAR unit 44a acquires information on a flight time (TOF: Time of Flight) $\Delta T1$ of a laser beam (optical pulse) at each emission angle (horizontal angle $\theta$, vertical angle $\phi$) of the laser beam. The LiDAR unit 44a can acquire information on a distance D between the LiDAR unit 44a and an object existing outside the vehicle 1 at each emission angle based on the information on the flight time $\Delta T1$ at each emission angle.

The millimeter-wave radar 45a is configured to detect radar data indicating the surrounding environment of the vehicle 1. In particular, the millimeter-wave radar 45a is configured to acquire radar data and then transmit the radar data to the millimeter-wave radar control unit 450a. The millimeter-wave radar control unit 450a is configured to acquire surrounding environment information based on the radar data. The surrounding environment information may include information on an object existing outside the vehicle 1. The surrounding environment information may include, for example, information on the position and direction of the object with respect to the vehicle 1 and information on a relative velocity of the object with respect to the vehicle 1.

For example, the millimeter-wave radar 45a can acquire the distance and direction between the millimeter-wave radar 45a and an object existing outside the vehicle 1 by a pulse modulation method, a Frequency Modulated-Continuous Wave (FMCW) method, or a dual frequency CW method. When using the pulse modulation method, after acquiring information on a millimeter-wave flight time $\Delta T2$, the millimeter-wave radar 45a can acquire information on the distance D between the millimeter-wave radar 45a and an object existing outside the vehicle 1 based on information on the flight time $\Delta T2$. Also, the millimeter-wave radar 45a can acquire information on the direction of the object with respect to the vehicle 1 based on a phase difference between a phase of a millimeter wave (received wave) received by one receiving antenna and a phase of a millimeter wave (received wave) received by the other receiving antenna adjacent to one receiving antenna. Further, the millimeter-wave radar 45a can acquire information on a relative velocity V of the object with respect to the millimeter-wave radar

45a based on a frequency f0 of a transmitted wave radiated from a transmitting antenna and a frequency f1 of a received wave received by a receiving antenna.

Further, each of the sensing systems 4b to 4d is similarly provided with a control unit, a lighting unit, a camera, a LiDAR unit, and a millimeter-wave radar. In particular, these devices of the sensing system 4b are disposed in a space Sb formed by a housing 24b of the front right lamp 7b and a translucent outer cover 22b illustrated in FIG. 1. These devices of the sensing system 4c are disposed in a space Sc formed by a housing 24c of the rear left lamp 7c and a translucent outer cover 22c. These devices of the sensing system 4d are disposed in a space Sd formed by a housing 24d of the rear right lamp 7d and a translucent outer cover 22d.

Returning to FIG. 2, the sensor 5 may include an acceleration sensor, a velocity sensor, a gyro sensor, and the like. The sensor 5 is configured to detect the traveling state of the vehicle 1 and output traveling state information indicating the traveling state of the vehicle 1 to the vehicle control unit 3. Further, the sensor 5 may have an outside air temperature sensor which detects an outside air temperature outside the vehicle 1.

The HMI 8 includes an input unit which receives an input operation from a driver and an output unit which outputs traveling information and the like to the driver. The input unit includes a steering wheel, an accelerator pedal, a brake pedal, a driving mode changeover switch for switching a driving mode of the vehicle 1, and the like. The output unit is a display (for example, Head Up Display (HUD) or the like) which displays various traveling information. The GPS 9 is configured to acquire current position information of the vehicle 1 and output the acquired current position information to the vehicle control unit 3.

The wireless communication unit 10 is configured to receive information about another vehicle around the vehicle 1 from another vehicle and transmit information about the vehicle 1 to another vehicle (vehicle-to-vehicle communication). Further, the wireless communication unit 10 is configured to receive infrastructure information from infrastructure equipment such as traffic lights and indicator lights, and to transmit the traveling information of the vehicle 1 to the infrastructure equipment (road-to-vehicle communication). Further, the wireless communication unit 10 is configured to receive information about a pedestrian from a portable electronic device (smartphones, tablets, wearable devices, and the like) carried by the pedestrian, and to transmit the own vehicle traveling information of the vehicle 1 to the portable electronic device (pedestrian-to-vehicle communication). The vehicle 1 may directly communicate with another vehicle, infrastructure equipment, or a portable electronic device in an ad hoc mode, or may communicate via a communication network such as the Internet.

The storage device 11 is an external storage device such as a hard disk drive (HDD) or a Solid State Drive (SSD). The storage device 11 may store two-dimensional or three-dimensional map information and/or a vehicle control program. For example, the three-dimensional map information may be composed of 3D mapping data (point cloud data). The storage device 11 is configured to output map information and a vehicle control program to the vehicle control unit 3 in response to a request from the vehicle control unit 3. The map information and the vehicle control program may be updated via the wireless communication unit 10 and the communication network.

When the vehicle 1 travels in an automatic driving mode, the vehicle control unit 3 automatically generates at least one of a steering control signal, an accelerator control signal, and a brake control signal based on traveling state information, surrounding environment information, current position information, map information, and the like. The steering actuator 12 is configured to receive a steering control signal from the vehicle control unit 3 and control the steering device 13 based on the received steering control signal. The brake actuator 14 is configured to receive a brake control signal from the vehicle control unit 3 and control the brake device 15 based on the received brake control signal. The accelerator actuator 16 is configured to receive an accelerator control signal from the vehicle control unit 3 and control the accelerator device 17 based on the received accelerator control signal. In this way, the vehicle control unit 3 automatically controls the traveling of the vehicle 1 based on the traveling state information, the surrounding environment information, the current position information, the map information, and the like. That is, in the automatic driving mode, the traveling of the vehicle 1 is automatically controlled by the vehicle system 2.

On the other hand, when the vehicle 1 travels in a manual driving mode, the vehicle control unit 3 generates a steering control signal, an accelerator control signal, and a brake control signal according to a manual operation of the driver with respect to the accelerator pedal, the brake pedal, and the steering wheel. As described above, in the manual driving mode, the steering control signal, the accelerator control signal, and the brake control signal are generated by the manual operation of the driver, so that the traveling of the vehicle 1 is controlled by the driver.

(Vehicular Lamp with Corner Cube Reflector)

Figure 4:
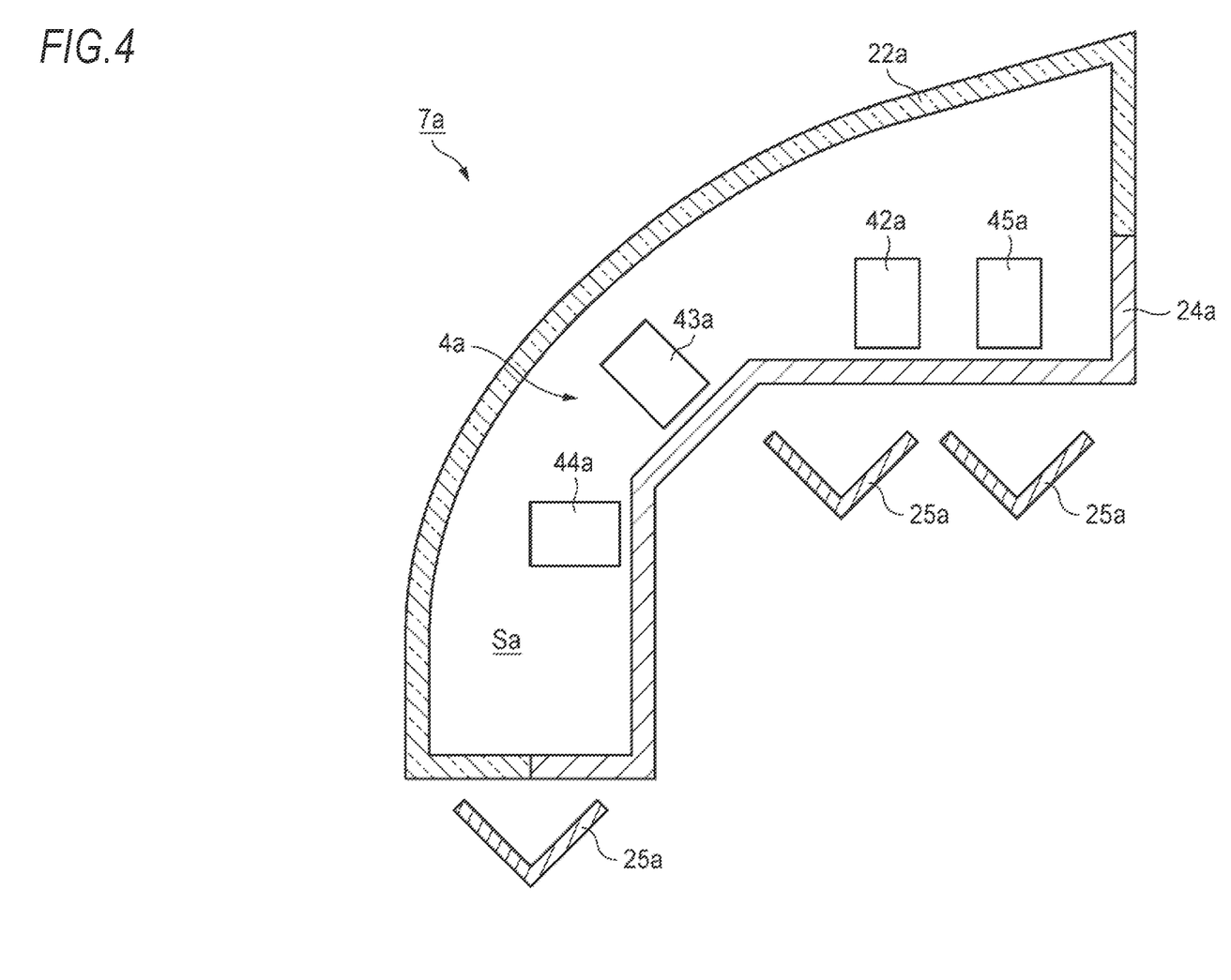
FIG. 4 is a cross-sectional view schematically illustrating a front left lamp according to the embodiment.

Next, with reference to FIG. 4, the front left lamp 7a on which a corner cube reflector 25a (hereinafter, may be simply referred to as "reflector 25a") is mounted will be described below. FIG. 4 is a cross-sectional view schematically illustrating the front left lamp 7a according to the embodiment. In the embodiment, only the front left lamp 7a will be described, but one or more corner cube reflectors are mounted on the front right lamp 7b, the rear left lamp 7c, and the rear right lamp 7d as well. Further, in FIG. 4, a lateral cross-sectional view of the reflector 25a is illustrated.

Figure 6:
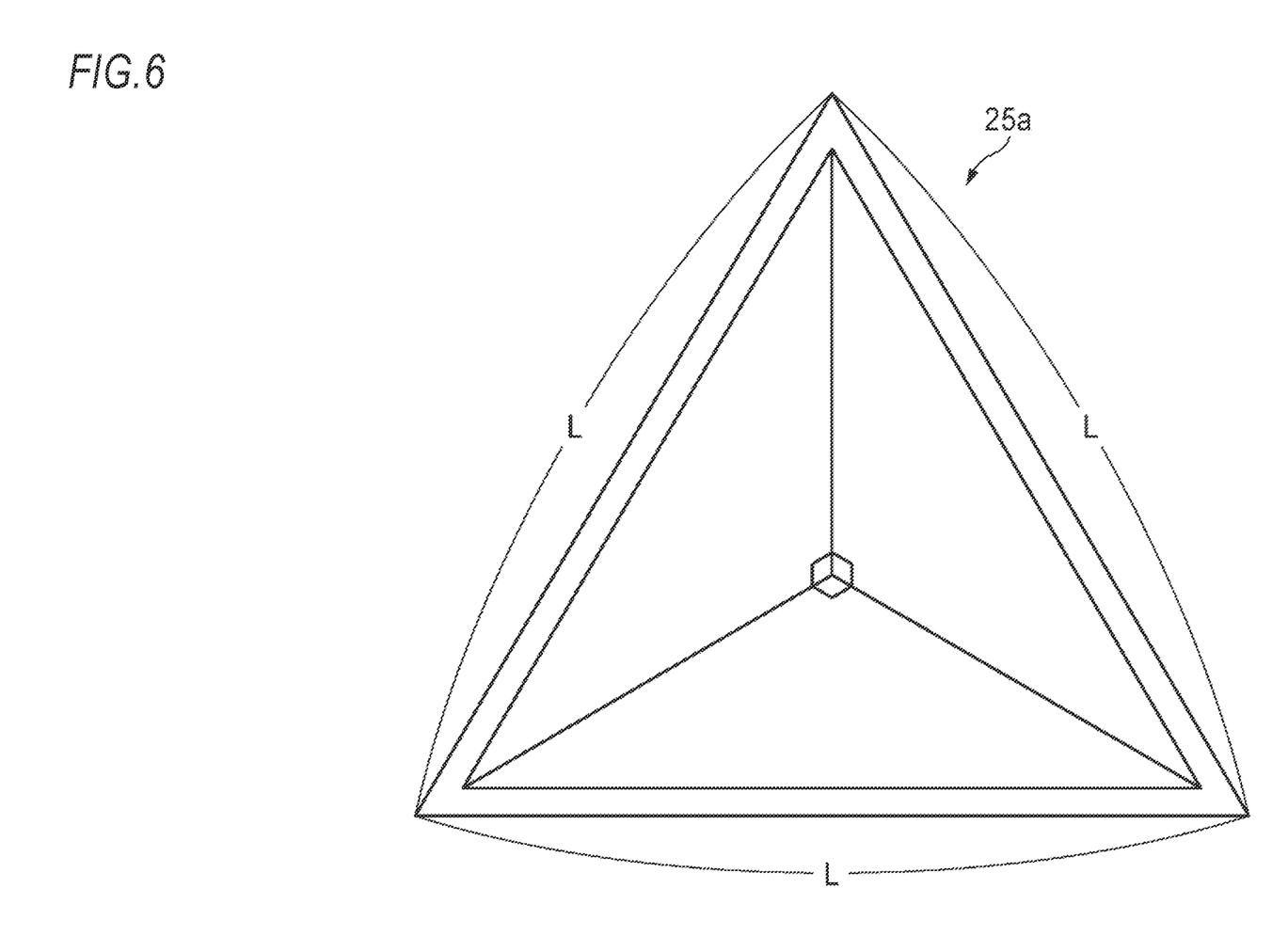
FIG. 6 is a diagram schematically illustrating a corner cube reflector.
Figure 7:
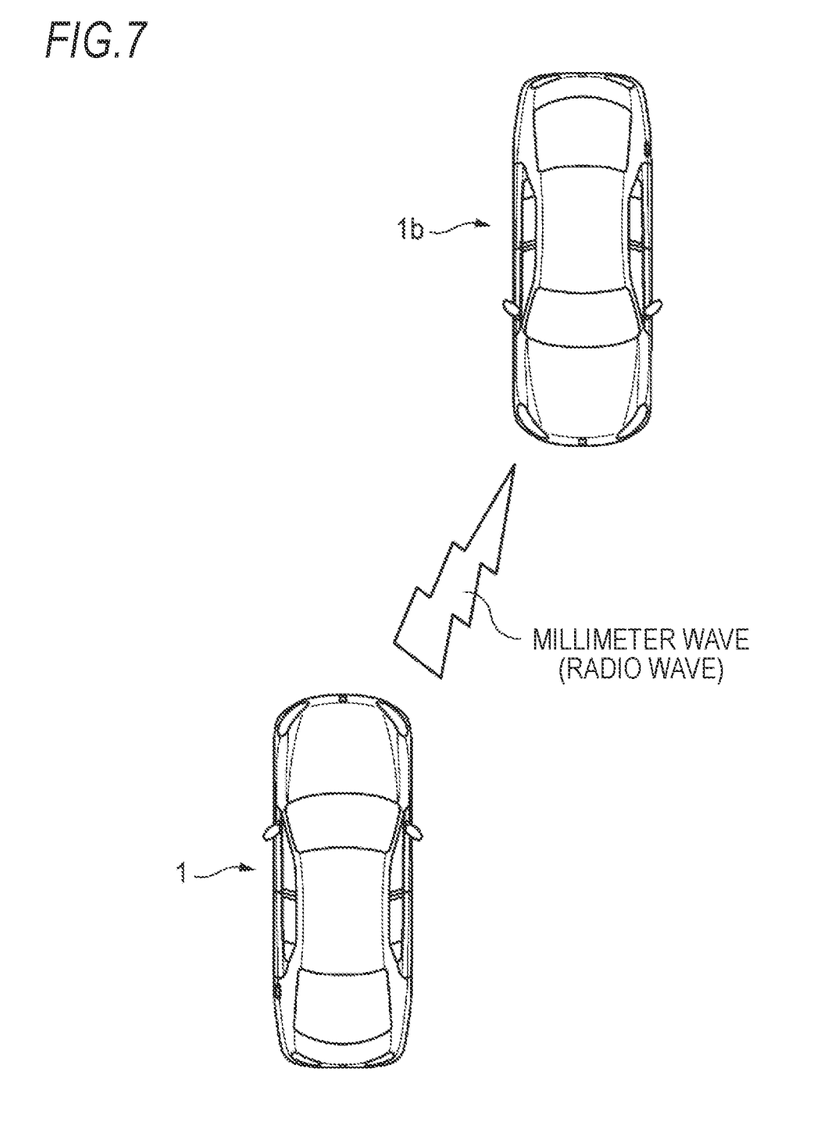
FIG. 7 is a diagram illustrating an own vehicle and another vehicle which radiates a millimeter wave.

As illustrated in FIG. 4, the lighting unit 42a, the camera 43a, the LiDAR unit 44a, and the millimeter-wave radar 45a are mounted in the space Sa formed by the housing 24a and the outer cover 22a. The mounting position of these devices is not particularly limited and the mounting position illustrated in FIG. 4 is merely an example. Further, a plurality of corner cube reflectors 25a are disposed outside the space Sa so as to face the housing 24a. The reflector 25a is configured to increase a radar radio wave reflectance. In particular, as illustrated in FIG. 7, the reflector 25a is configured to increase reflectance for a millimeter-wave radar (radio wave) radiated from another vehicle 1b. The reflector 25a is made of, for example, a metal member. Further, as illustrated in FIG. 6, the reflector 25a may be configured as a triangular pyramid having a side length of L. In this case, a radar reflection cross-sectional area (RCS) of the reflector 25a can be calculated by the following equation (1).

$$RCS = \pi L^4 / 3\lambda^2 \quad (1)$$

Here, $\lambda$ is a wavelength of the radio wave incident on the reflector 25a. For example, when the frequency of the millimeter wave incident on the reflector 25a is 76.5 GHz, the wavelength $\lambda$ is about 3.9 mm. In this case, the RCS is 10 m² when L=0.11 m.

According to the embodiment, since the reflector 25a is mounted on the front left lamp 7a, it is possible to provide the front left lamp 7a capable of increasing the reflectance of radar radio waves radiated from another vehicle. In particular, it is possible to improve the RCS of the front left lamp 7a by the reflector 25a. Therefore, as illustrated in FIG. 7, the vehicle 1 is easily detected by the millimeter-wave radar of another vehicle 1b. In this way, since the vehicle 1 is easily detected by another vehicle around the vehicle 1, it is possible to suitably prevent a situation in which another vehicle cannot detect the vehicle 1. In the embodiment, as an example, three reflectors 25a are mounted on the front left lamp 7a, but the number of reflectors 25a mounted on the front left lamp 7a is not particularly limited. For example, one reflector 25a may be mounted on the front left lamp 7a. Further, a plurality of reflectors 25a may be arranged in a predetermined direction.

Figure 5:
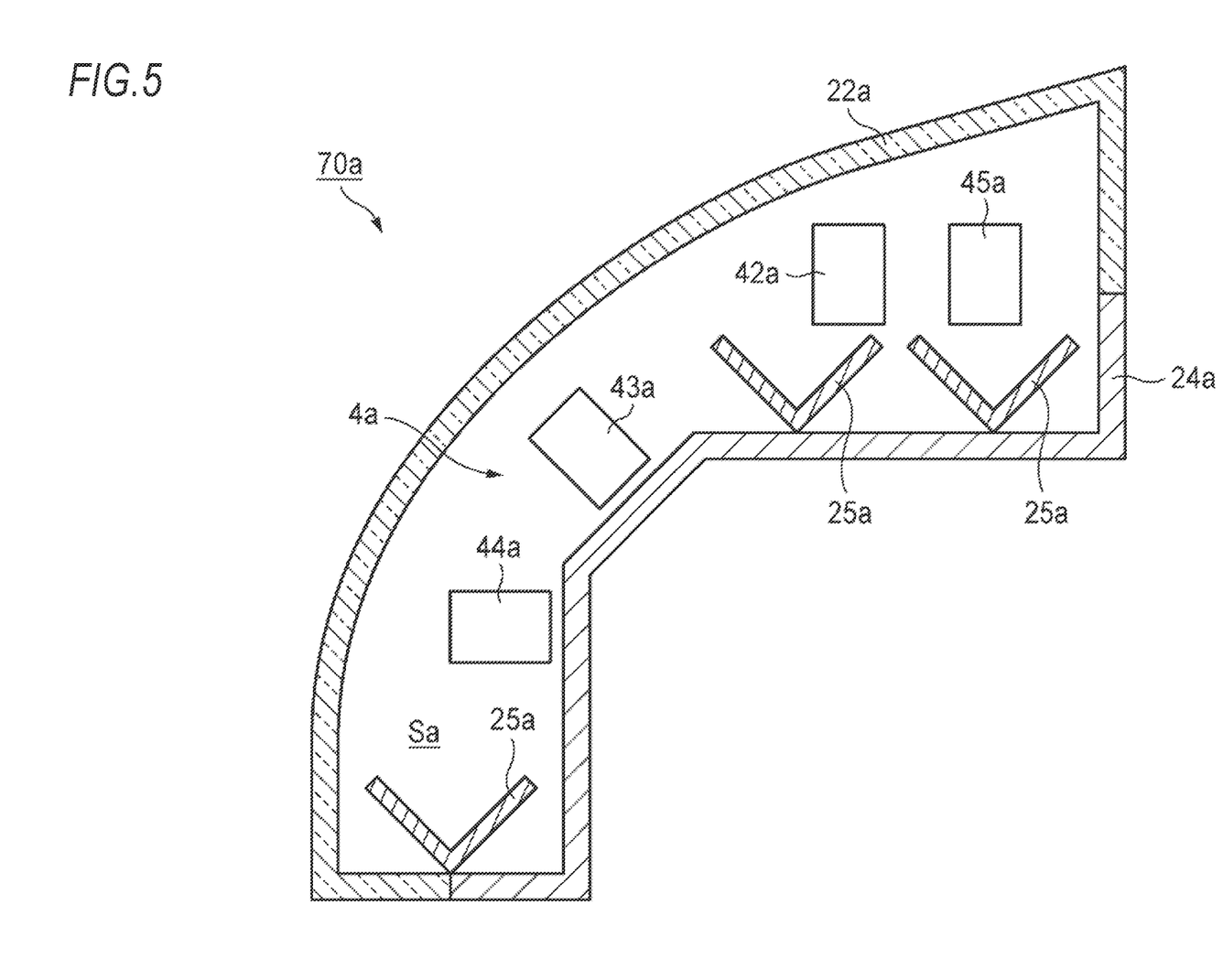
FIG. 5 is a cross-sectional view schematically illustrating a front left lamp according to a modification example.

Next, a front left lamp 70a according to a modification example will be described below with reference to FIG. 5. FIG. 5 is a cross-sectional view schematically illustrating the front left lamp 70a according to the modification example. The front left lamp 70a is mainly different from the front left lamp 7a illustrated in FIG. 4 in the mounting position of the reflector 25a. As illustrated in FIG. 5, the plurality of reflectors 25a are disposed in the space Sa so as to face the housing 24a and the outer cover 22a. In this way, since the reflector 25a is disposed in the space Sa, it is possible to suppress an increase in an outer size of the front left lamp 7a.

In the embodiment and the modification example, the reflector 25a is described as an example of a member configured to increase the radar radio wave reflectance from another vehicle, but the member is not limited to the reflector 25a. For example, a flat metal member may be mounted on the front left lamp 7a instead of the reflector 25a. Even in this case, the RCS of the front left lamp 7a can be improved. Further, a part of an optical member disposed in the space Sa may be configured as a corner cube reflector. Further, a part of the outer cover 22a and/or the housing 24a may be configured as a corner cube reflector.

(Another Example of Vehicular Lamp to Increase Radar Radio Wave Reflectance)

Figure 8A:
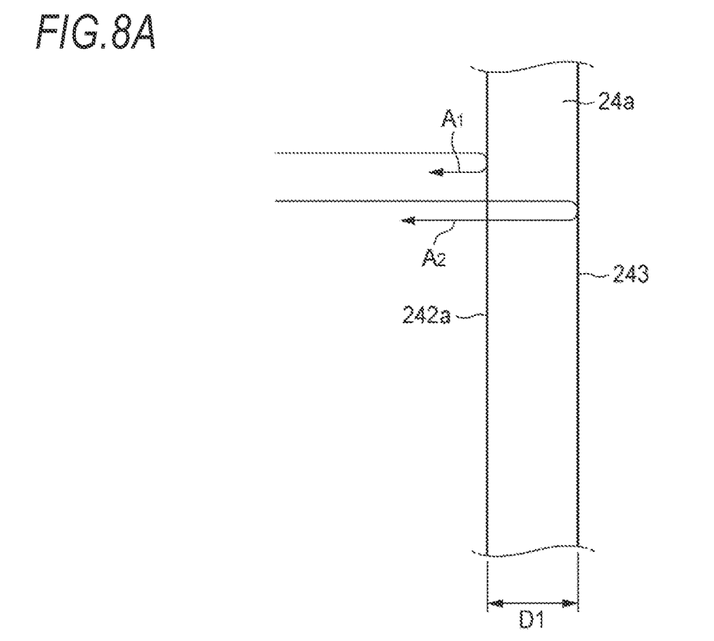
FIG. 8A is a cross-sectional view illustrating a part of a housing.

Next, another example of a vehicular lamp (particularly, the front left lamp 7a) for increasing the radar radio wave reflectance will be described below with reference to FIG. 8A. FIG. 8A is a cross-sectional view illustrating a part of the housing 24a. In this example, instead of mounting the reflector 25a for increasing the radar radio wave reflectance on the front left lamp 7a, a thickness of the housing 24a is set to a thickness D1 defined in the following equation (2).

$$D1 = \frac{1}{4} \times \lambda / \varepsilon_{r1}^{1/2} \times (2n+1) \tag{2}$$

Here, $\lambda$ is the wavelength of the radar radio wave incident on the housing 24a, $\varepsilon_{r1}$ is relative permittivity of the housing 24a, and $n$ is an integer of zero or more.

As described above, since the thickness of the housing 24a is set to the thickness D1 defined in equation (2) described above, as illustrated in FIG. 8A, a reflected radio wave A1 reflected by a first surface 242a of the housing 24a and a reflected radio wave A2 reflected by a second surface 243a located on an opposite side of the first surface 242a of the housing 24a strengthen each other. Specifically, since a phase difference $\Delta\theta$ between the reflected radio wave A1 and the reflected radio wave A2 is $2\pi \times m$ (m is an integer of zero or more), the reflected radio wave A1 and the reflected radio wave A2 strengthen each other. In this way, the housing 24a can increase the reflectance for the radar radio wave radiated from another vehicle. For example, when the wavelength $\lambda$ of the radar radio wave is 3.92 mm (frequency f=76.5 GHz) and the relative permittivity $\varepsilon_r$ of the housing 24a is 2.7, the thickness of the housing 24a is preferably set to 0.599 mm×(2n+1).

Figure 8B:
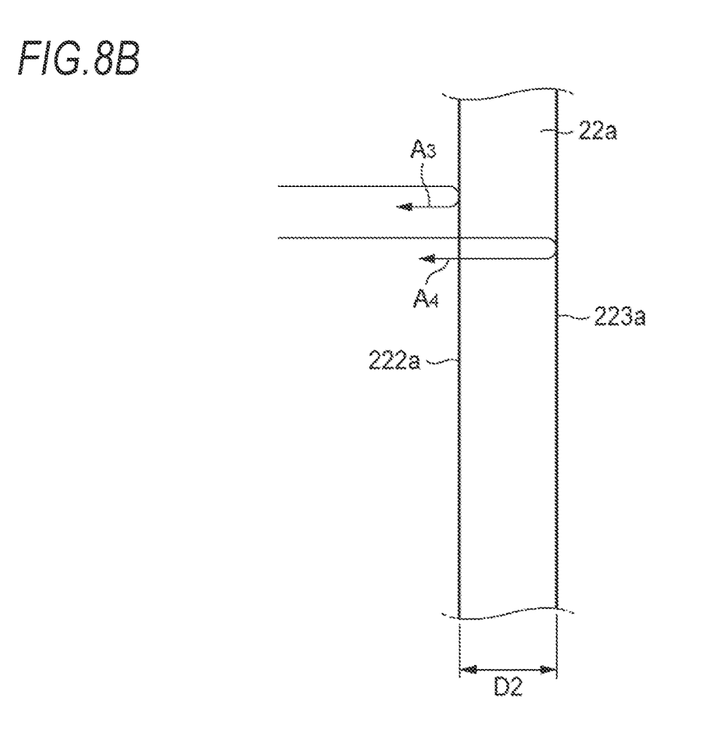
FIG. 8B is a cross-sectional view illustrating a part of an outer cover.

Next, another second example of a vehicular lamp (particularly, the front left lamp 7a) for increasing the radar radio wave reflectance will be described below with reference to FIG. 8B. FIG. 8B is a cross-sectional view illustrating a part of the outer cover 22a. Similarly in this example, instead of mounting the reflector 25a for increasing the radar radio wave reflectance on the front left lamp 7a, the thickness of the outer cover 22a is set to a thickness D2 defined in the following equation (3).

$$D2 = \frac{1}{4} \times \lambda / \varepsilon_{r2}^{1/2} \times (2n+1) \tag{3}$$

Here, $\lambda$ is the wavelength of the radar radio wave incident on the outer cover 22a, $\varepsilon_{r2}$ is the relative permittivity of the outer cover 22a, and $n$ is an integer of zero or more.

As described above, since the thickness of the outer cover 22a is set to the thickness D2 defined in equation (3) described above, as illustrated in FIG. 8B, a reflected radio wave A3 reflected by a first surface 222a of the outer cover 22a and a reflected radio wave A4 reflected by a second surface 223a located on an opposite side of the first surface 222a of the outer cover 22a strengthen each other. Specifically, since a phase difference $\Delta\theta$ between the reflected radio wave A3 and the reflected radio wave A4 is $2\pi \times m$ (m is an integer of zero or more), the reflected radio wave A3 and the reflected radio wave A4 strengthen each other. In this way, the outer cover 22a can increase the reflectance for the radar radio wave radiated from another vehicle. For example, when the wavelength $\lambda$ of the radar radio wave is 3.92 mm (frequency f=76.5 GHz) and the relative permittivity $\varepsilon_{r2}$ of the outer cover 22a is 2.7, the thickness of the outer cover 22a is preferably set to 0.599 mm×(2n+1).

In the embodiment, the thickness of the housing 24a may be set to the thickness D1 defined in equation (2), and the thickness of the outer cover 22a may be set to the thickness D2 defined in equation (3). In this case, since both the housing 24a and the outer cover 22a are configured to increase the radar radio wave reflectance, the overall radar radio wave reflectance of the front left lamp 7a can be further increased. Further, the thickness of either the housing 24a or the outer cover 22a may be set to the thickness defined in equation (2) or equation (3). Even in this case, the overall radar radio wave reflectance of the front left lamp 7a can be increased. Further, the reflector 25a may be provided on the front left lamp 7a and the thickness of at least one of the housing 24a and the outer cover 22a may be set to the thickness D defined in the following equation (4).

$$D = \frac{1}{4} \times \lambda / \varepsilon_r^{1/2} \times (2n+1) \tag{4}$$

Here, $\lambda$ is the wavelength of the radar radio wave incident on the housing 24a, $\varepsilon_r$ is the relative permittivity of at least one of the housing 24a and the outer cover 22a, and $n$ is an integer of zero or more.

Although the embodiments of the invention are described above, it goes without saying that the technical scope of the invention should not be construed as being limited by the description of the embodiments. It will be appreciated by those skilled in the art that the embodiment is merely an example and that various embodiments can be modified within the scope of the invention described in the claims. The technical scope of the invention should be determined based on the scope of the invention described in the claims and the equivalent scope thereof.

This application appropriately incorporates the contents disclosed in the Japanese patent application (Japanese Patent Application No. 2019-042663) filed on Mar. 8, 2019.

REFERENCE SIGNS LIST

1: vehicle
2: vehicle system
3: vehicle control unit
4a: front left sensing system
4b: front right sensing system
4c: rear left sensing system
4d: rear right sensing system
5: sensor
7a, 70a: front left lamp
7b: front right lamp
7c: rear left lamp
7d: rear right lamp
10: wireless communication unit
11: storage device
12: steering actuator
13: steering device
14: brake actuator
15: brake device
16: accelerator actuator
17: accelerator device
22a, 22b, 22c, 22d: outer cover
24a, 24b, 24c, 24d: housing
25a: corner cube reflector (reflector)
40a: control unit
42a: lighting unit
43a: camera
44a: LiDAR unit
45a: millimeter-wave radar
420a: lighting unit control unit
430a: camera control unit
440a: LiDAR unit control unit
450a: millimeter-wave radar control unit

The invention claimed is:

1. A vehicular lamp comprising:
a member configured to increase radar radio wave reflectance;
a housing;
an outer cover covering an opening of the housing; and
a lighting unit disposed in a space formed by the housing and the outer cover,
wherein
the member is at least one of the outer cover and the housing, and
a thickness D of at least one of the outer cover and the housing is defined by a following equation $$D = \frac{1}{4} \times \lambda / \varepsilon_r^{1/2} \times (2n+1)$$

here, $\lambda$ is a wavelength of a radar radio wave, $\varepsilon_r$ is relative permittivity of at least one of the outer cover and the housing, and n is an integer of zero or more.

2. The vehicular lamp according to claim 1,
wherein the member is at least one metal member disposed to face the housing.

3. The vehicular lamp according to claim 2, wherein the metal member is disposed in the space.

4. The vehicular lamp according to claim 2, wherein the metal member is configured as a corner cube reflector.

5. The vehicular lamp according to claim 1, wherein when the wavelength $\lambda$ of the radar radio wave is 3.92 mm and the relative permittivity is 2.7, the thickness D is set to 0.59 mm×(2n+1).

6. A vehicle which includes the vehicular lamp according to claim 1.

* * * * *